Feb. 16, 1971  E. D. KITTREDGE  3,563,647
OPTICAL SIGNAL TRANSLATOR
Filed May 21, 1968
2 Sheets-Sheet 1
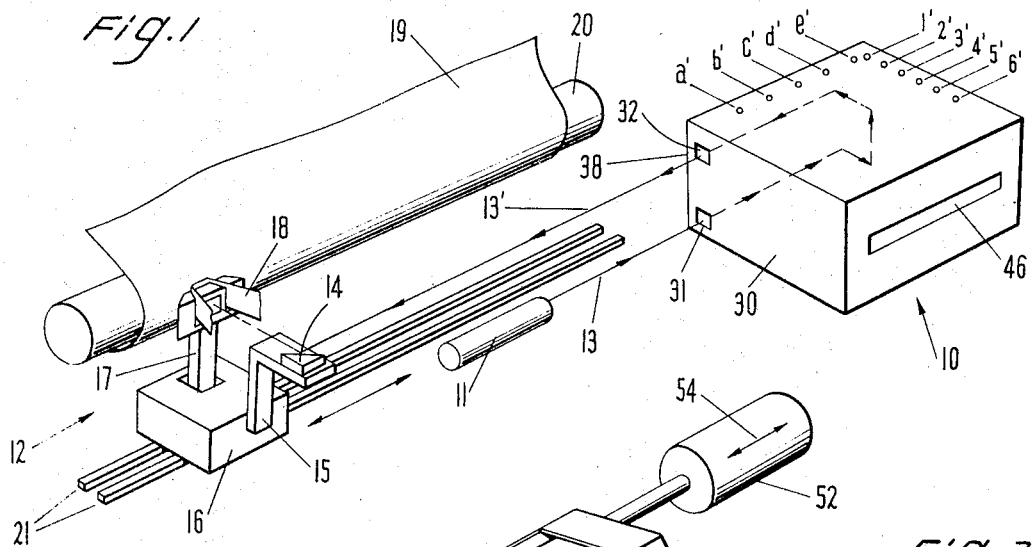
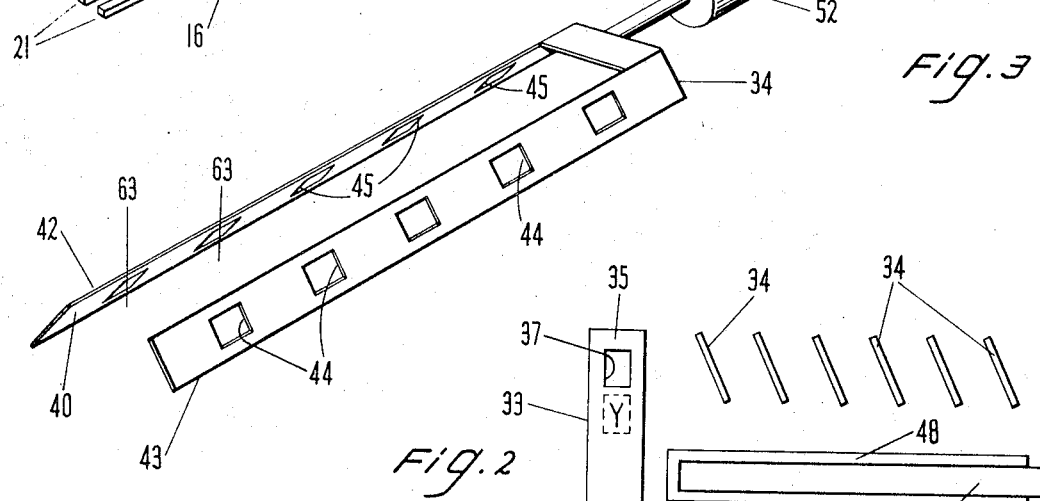
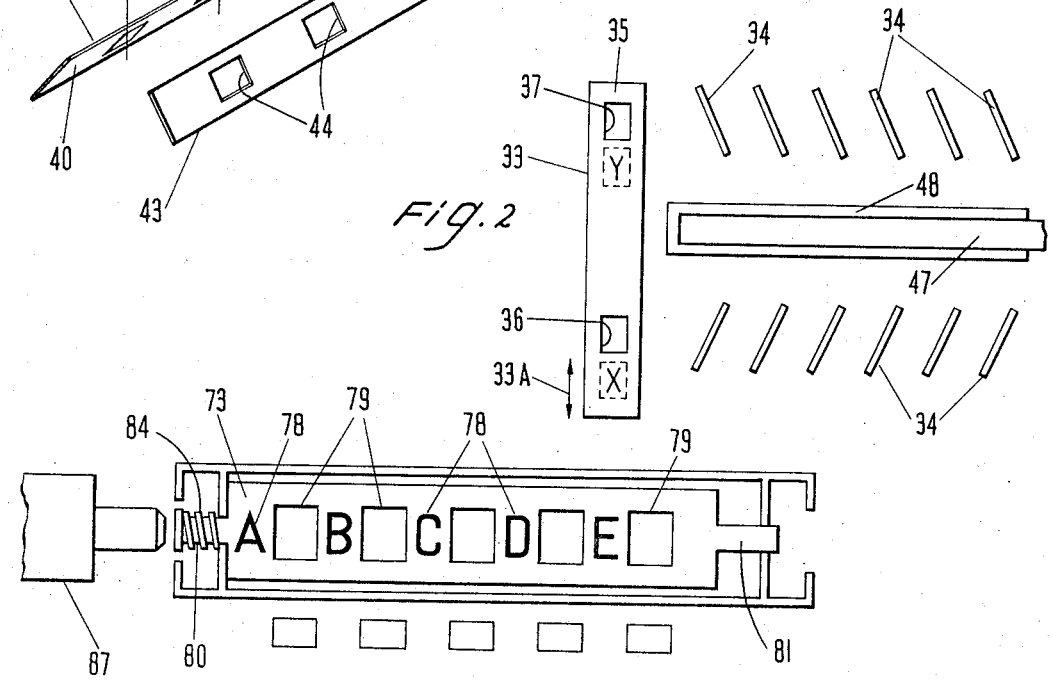
INVENTOR
Edward D. Kittredge
BY
Wolf, Greenfield & Sacks

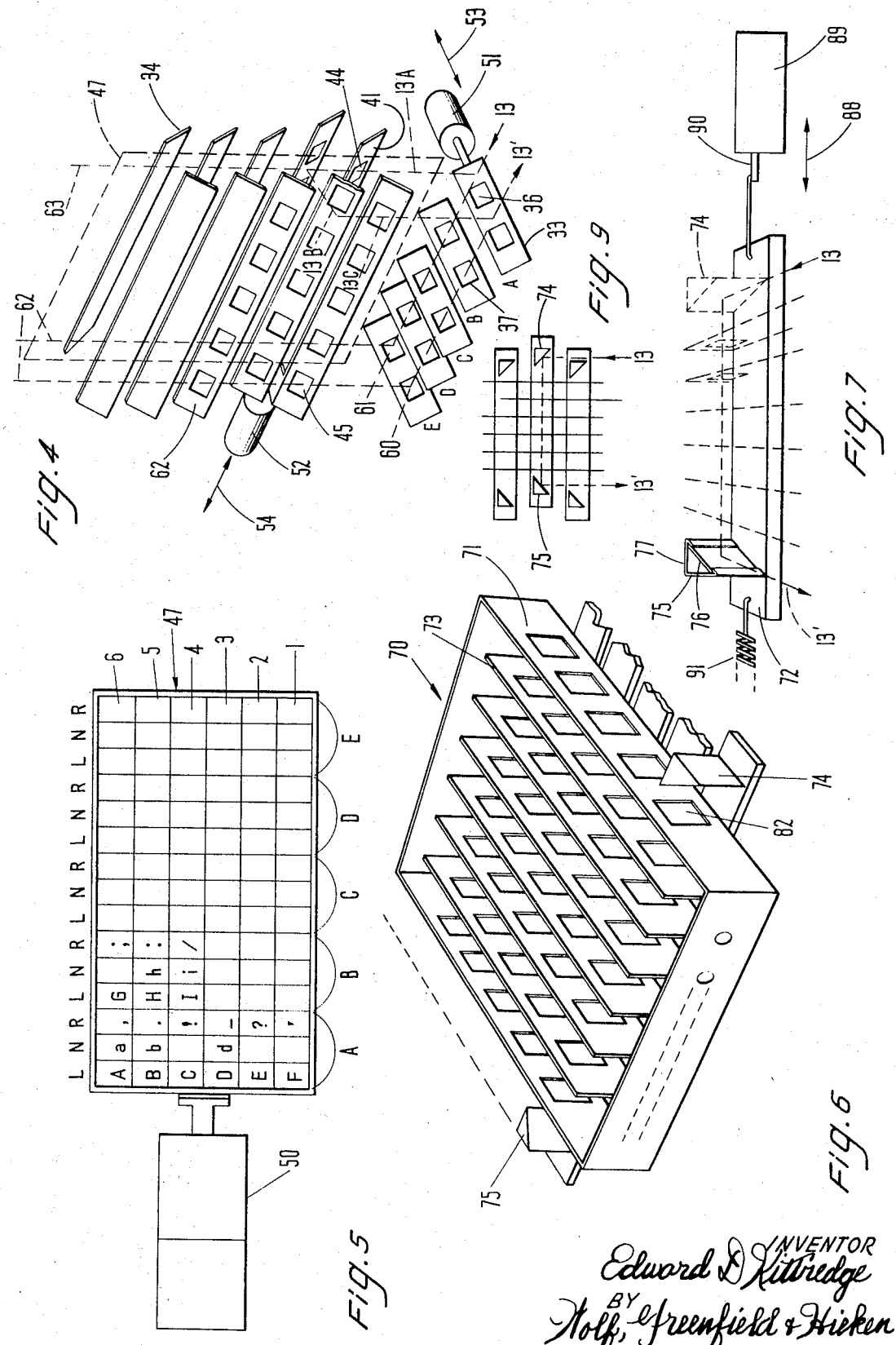

3,563,647
Patented Feb. 16, 1971

3,563,647
OPTICAL SIGNAL TRANSLATOR
Edward D. Kittredge, Nashua, N.H.
(P.O. Box 152, Kittery Point, Maine 03060)
Filed May 21, 1968, Ser. No. 733,737
Int. Cl. G03b 27/70; B41b 13/00
U.S. Cl. 355—43                                    4 Claims

ABSTRACT OF THE DISCLOSURE

An optical signal translator is provided for use in printing and other applications. The signal translator has a first row of first selectors comprising a plurality of light reflecting surfaces for against deflecting the beam of light substantially parallel to the row. A second aligned row of second selectors comprises a plurality of aligned light reflecting surfaces for again deflecting the beam of light. An image means carries a plurality of images in predetermined relationship to the first and second rows. Means are provided for selecting one of the first plurality light reflecting surfaces and moving it into an operative position with respect to the beam of light to cause reflection of said beam of light through a selected one of said images to translate said beam of light into a light image. The optical signal translator is preferably used in conjunction with a parallel axis light beam which is deflected by the translator to produce a desired image which can be in turn converted into a recorded image.

BACKGROUND OF THE INVENTION

A variety of printing devices are known most of which use mechanical or electrical translation means or a combination of electrical and mechanical translation means to select a character to be printed. Such devices are often expensive, complex, bulky and/or limited in speed of operation. In some cases, the time required for selection of a particular character to be printed is excessively long. As used in this disclosure, the term "printing" refers to any means or method of recording an image on a substrate and includes for example reproduction as by the use of a typewriter.

SUMMARY OF THE INVENTION

The optical signal translator of this invention has a first aligned row of first selectors comprising a plurality of aligned light reflecting surfaces for deflecting a beam of light substantially parallel to the row. A second aligned row of second selectors comprises a plurality of aligned light reflecting surfaces for again deflecting said beam of light. An image means carries a plurality of images in predetermined relationship to the first and second rows. Means are provided for selecting one of the first plurality of light reflecting surfaces and moving it into an operative position with respect to the beam of light to cause reflection of said beam of light through one of said images to translate said beam of light into a light image. One of the second plurality of light reflecting surfaces is operative to again reflect the beam of light carrying the image. In a preferred embodiment, four rows of light reflecting surfaces are provided. An important feature of the preferred embodiment of the invention is the use of light reflecting means having means for reflecting light alternating with means for permitting passage of light.

Preferably the optical signal translator of this invention comprises a part of printing mechanism having a light source preferably providing parallel axis, nondefracting light beams and a printing means for changing said light image into a printed image as in a typewriter or other printing device. The image is preferably a character such as a printed letter or number carried by a matrix which has a plurality of different characters available for selection.

It is a feature of this invention that the optical signal translator can be made with few parts at small cost and with small size. Yet, the signal translator permits image selection rapidly at speeds at least as high as 1000 words per minute. A large variety of characters are available for selection in short time periods. When the image means is made interchangeable with other image means, as can easily be done, use of a single instrument for printing any language and/or groups of numbers can be carried out at small cost as by the use of interchangeable character fonts. Silent operation printers can be made which are of extremely light weight and small size.

The optical signal translators of this invention can also be used in other devices than printers as in image selection for visual displays, office reproduction apparatus, editorial machines, computer read-outs and the like.

BRIEF DESCRIPTION OF THE DRAWINGS

The above and other features and advantages of the present invention will be more clearly understood from the following description when read in connection with the accompanying drawings in which:

FIG. 1 is a front semidiagrammatic view of a printing device embodying a preferred embodiment of the optical signal translator of this invention;

FIG. 2 is a diagrammatic view through one end of said translator;

FIG. 3 is a perspective view of an element thereof;

FIG. 4 is a perpsective view of elements of said translator;

FIG. 5 is a front view of an element thereof;

FIG. 6 is a top perspective view of an alternate embodiment of the optical signal translator of this invention;

FIG. 7 is a semidiagrammatic view showing elements thereof;

FIG. 8 is a semidiagrammatic view showing elements thereof; and

FIG. 9 is a front view of elements thereof.

DESCRIPTION OF PREFERRED EMBODIMENTS

With reference now to the drawings, a preferred embodiment of the optical signal translator is illustrated at 10 in FIG. 1 in combination with a light source 11 and a printing means of the typewriter type 12.

The light source 11 is preferably a laser light source although any means of providing substantially parallel, axial, nondefracting light can be used. For example, a conventional bulb light source can be used along with suitable lenses to provide a parallel, axial, light beam 13. The light beam 13 is translated within the optical signal translator 10 and emerges therefrom at 13' carrying a character or image signal. The light beam 13' is then passed through a prism 14 mounted on a bracket 15 extending from a base 16. A second bracket 17 extends from the base 16 and carries a sensitized tape 18 which is acted on by the light beam 13' to print a character or image selected in the selector 10 on any type of paper or other substrate 19 preferably fed on a conventional typewriter roller 20. Preferably the base 16 is mounted on rails 21 and moves to an adjacent position after each image is printed.

Turning now to the optical signal translator 10, a preferably lightproof outer housing 30 defines a light beam entrance port 31 and a light beam exit port 32. As best seen in FIGS. 2–4, a first plurality of planar first selectors 33 are aligned in a row and are preferably each substantially perpendicular to the bottom of the housing 10 and parallel to each other. A second plurality of second selectors 34 are aligned in a second row.

Each selector 33 comprises an elongated strip of a reflecting surface such as a mirror surface 35 with a lower light transmitting cutout or aperture 36 and an upper cutout or aperture 37. All of apertures 36 and 37 are aligned respectively with the light beam portions 13 and 13' when the selectors 33 are in a neutral or non-activated position. Light reflecting surface portions X and Y (FIG. 2) of each selector 33 are mounted for movement into rows axially aligned with beam portions 13 and 13' respectively when one selector 33 is moved as by reciprocation in the directions shown by arrow 33a. As best seen in FIG. 4, the plane of each mirror surface 35 is preferably tilted at an angle of 45° to a vertical plane passing through the rear side 38 (not fully shown) of the housing.

Each selector 34 is preferably formed as a fork-like member, as best seen in FIG. 3, defining an inwardly facing mirror reflecting surface 40 and a corresponding mirror reflecting surface 41 on planar arms 42 and 43. A plurality of spaced apertures or cutouts 44 are aligned on arm 43 and a corresponding plurality of spaced apertures 45 are aligned on arm 42 to define corresponding opposing, alternate reflecting and light transmitting portions on each arm of the selector 34. Preferably each of the selectors 33 is identical to each other as is true with each of the selectors 34.

A cutout 46 is provided in a side of the housing 30 to permit positioning of a matrix 47 therein preferably in a clip or matrix holder 48 as best seen in FIGS. 1, 2 and 5. The matrix 47 is positioned between opposing arms of each of the selectors 34 as best seen in FIG. 4, preferably perpendicular to side 38 of the housing.

The matrix 47 is preferably a planar sheet of transparent material as shown in FIG. 5, divided into a plurality of horizontal columns 1, 2, 3, 4, 5 and 6 and vertical columns a, b, c, d and e (each further divided into three columns corresponding to L-left, N-neutral, R-right). Thus, the columns on the matrix define squares each carrying a character as indicated in FIG. 5. For example, in the square containing A, all portions of the square are blackened to prevent light passage while the A configuration is light transmitting. The left, neutral and right position of the matrix can be set by means of a solenoid diagrammatically illustrated at 50 positioned either within or without the housing so as to determine which characters are aligned with selected light transmitting portions 44 and 45 of the selectors 34 when in their operative position as shown for one of selectors 34 in FIG. 4.

There need be no provision for a shift from left, neutral or right and a matrix can be positioned in a fixed position within the holder 48 having a single row of characters in each vertical column a, b, c, d and e. The number of horizontal and/or vertical columns can be increased or decreased as desired to provide for character selection limited only by the ultimate size desired for the optical signal translator. In the preferred embodiment, five selectors 34 are used and six selectors 33 used having apertures corresponding in position to the horizontal columns 1–6 and the neutral one of the vertical columns a–e respectively. Numbers, letters, or other images can be provided on the matrix depending upon the particular use of the optical signal translator of this invention. In some cases, the sheet of the matrix 47 can be opaque with cutout areas for the images to be projected.

Each selector 33 and each selector 34 is preferably actuated for reciprocal straight lines movement substantially along its long axes by means of solenoids such as 51 and 52 (FIG. 4). The solenoids actuate reciprocal movement in the direction of arrows 53 and 54.

Suitable selector switches a'–e' and 1'–6' are provided for actuation of selected ones of the solenoids 51 and 52 with one of each being selected to obtain selection of a desired character. The solenoids can be electrically connected with the actuating means for the light beam 11 to enable selection of successive characters on the matrix by simultaneously moving one of selectors 33 along with one of selectors 34 when the light beam 13 is actuated.

Operation of the signal translator to select a desired character or image is extremely rapid and simple. In the rest position, apertures 37 of each of the selectors 33 are aligned along a central axis 60 and apertures 36 are aligned along a central axis 61 parallel to axis 60. Similarly, each of the apertures 45 are aligned along parallel axes 62 and apertures 44 are aligned along axes 63 with axes 62 and 63 preferably being perpendicular to and in the same plane as axes 60 and 61 respectively.

By selecting any one of solenoid actuators a'–e' along with any one of solenoid actuators 1'–6', a particular character is aligned with the path of the light beam 13. Thus, when the one selector 33 is actuated to move so that its reflecting surfaces are aligned with axes 60 and 61 and simultaneously one of the selectors 34 is moved so that its reflecting surfaces are aligned with axes 62 and 63, a particular character is selected. Thus, as best shown in FIG. 4, the light beam 13 passes through all apertures 36 until it meets a light reflecting portion whereupon the beam is bent upwardly at 13a passing through apertures 44 until it meets an out of line reflecting surface of a selector 34 whereupon it is bent at 13b until it meets with reflecting surface 40 to bend the beam again at 13c whereupon it passes through aligned aperture 45 until it is reflected by the selector 33 to form the emerging beam portion 13'. The emerging beam portion 13' carries the image corresponding to the portion of the matrix through which the beam of light passed. Preferably each of the deflections of the beam are at 90° angles. The beam portion 13' passes to the prism 14 where it is turned to pass through the holder 17 and activate a portion of the tape 18 corresponding to the image selected.

The tape 18 is preferably formed of a thin backer layer of plastic carrying a heat sensitive ink such as black wax or an encaustic ink. The heat sensitive ink layer is pressed directly against the paper 19 so that the beam 13' will cause transfer of the ink from the tape to the paper because of the light pressure and heat generated. It should be understood that in some applications, the beam 13' carrying the image may be projected directly on a photography screen or other means and used without translating the light beam into a written or printed character.

With reference now to FIGS. 6–8, an alternate embodiment of an optical signal translator in accordance with this invention is illustrated generally at 70 and comprises a housing 71 under which are mounted first selector means 72 and within which are mounted second selector-matrix means 73. The principles of this embodiment are generally similar to the embodiment of FIG. 1 except that the matrix 47 is modified to provide a single horizontal column of images to be selected rather than horizontal columns and vertical columns. In this embodiment, the same characters as are used in the embodiment of FIG. 1 are normally contained in a flat rectangular box housing of the type shown at 70 in FIG. 6. The number of characters are limited only by the size of the housing.

A first row of selectors 74 is arranged on one side of each of a plurality of aligned selector bars 72 with a second row of selectors 75 arranged in a second row parallel to the first row preferably on a second side of each of the bars 72. In the embodiment shown, five selector bars 72 and twenty matrices 73 are used (in order to simplify the drawings only six matrices 73 are illustrated). The selectors 74 and 75 are light reflecting surfaces such as mirrors 76 held in place by spring clips 77 on the bars 72 as illustrated in FIG. 7. The mirrors 76 of all of the selectors 74 and 75 are preferably arranged at an angle such as a 45° angle to the path of the light beam 13 or 13' respectively. Parallel matrices 73 as best illustrated in FIGS. 7 and 9 are spaced between the parallel rows of selectors 74 and 75 preferably parallel thereto with bars 72 perpendicular to the matrices 73.

As shown in FIG. 8, each matrix 73 comprises an opaque strip having a series of areas defining light transmitting characters 78 separated by cutout or light transparent areas 79. In the rest position of the matrices, the areas 79 of adjacent parallel matrices are axially aligned as are the characters 78 of adjacent matrices. The strips preferably have ends 80, 81 mounted in the housing by springs 84 so that each matrix can be reciprocally moved in the directions of arrow 85 as from the position shown in FIG. 8 to one where the matrix is shifted to the right. Shifting of each matrix is preferably carried out by solenoid actuated push rods such as 87 although manual or other operation can be used.

The actuating means for reciprocally moving the bars 72 in the directions of arrow 88 can comprise spring 91 fixed at an end not shown to an extension of the housing and an arm linked solenoid such as 89. Thus, by moving the rod 90 of solenoid 89 to the right as shown in FIG. 7, the entire bar 72 will be shifted and then spring returned to its original position when the solenoid is deactuated.

In operation of the embodiment 70, selectors 74 and 75 normally lying in two parallel rows are actuated by movement of a solenoid 89 to move one bar 72 out of position as shown in FIG. 9, and thus intercept the light beam 13 which bypasses other selectors not moved from their static position. Simultaneously, the selected one of the matrices 73 is actuated as by solenoids 87 to move a character into line with one of the aligned rows of apertures 79. Thus, a light beam 13 is deflected by the light reflecting surfaces of the mirror of selector 74, as shown in FIG. 9, to pass through one of apertures 82 and one character of the selected matrix to an opposed selector 75 and out of the signal translator through light beam 13' parallel to beam 13. Light beam 13' carries the selected image. Any desired character can be selected by movement of selected combinations of one matrix and one selector bar 72.

While specific embodiments of the optical signal translator of the present invention have been shown and described, it should be understood that many variations thereof are possible. For example, manual operation of each of the translators can be used. The particular programming means for simultaneous actuation of the light source and selectors 33 and 34 of embodiment 10 or the light source, selector-matrix and selectors of embodiment 70 can be any known electrical or mechanical means such as a keyboard-type arrangement as commonly known for use with electrical typewriters. The particular ribbon 18 may vary as may the substrate 19. In some cases, the roll 20 will be reciprocated from side to side rather than moving the tape. In all cases, there is a constant predetermined distance of movement of all moving parts to enable simplified operation and predetermined alignment of parts such as the selectors and matrices.

In view of the many modifications possible, this invention is to be limited only by the spirit and scope of the appended claims.

What is claimed is:
1. Optical signal translation apparatus comprising,
   a source of a collimated light beam,
   first and second planar reflecting surfaces each formed with alternating transparent and reflecting portions for transmitting and reflecting respectively light rays,
   means for supporting said first and second planar reflecting surfaces in fixed relationship to each other in space quadrature with the transparent and reflecting portions of each aligned with the transparent and reflecting portions of the other and defining a gap therebetween for receiving a font of symbols arranged in at least one row generally parallel to the length of said first and second reflecting surfaces with each of said symbols associated with a contiguous pair of transparent and reflecting portions in each of said first and second reflecting surfaces to permit election of that symbol when light rays reflected from both associated reflecting surfaces passes through that character,
   said font in said gap,
   means for directing said beam along a path that may include reflection from said first surface through said font and reflection from said second surface,
   and means for selectively displacing said first and second surfaces between a first position in which transparent portions intercept said path and a second position in which reflecting surfaces intercept said path,
   whereby in said second position a symbol in the font row embraced by said first and second surfaces may be selected.

2. Optical signal translation apparatus in accordance with claim 1 and further comprising at least another pair of said first and second reflecting surfaces, said means for supporting and said means for selectively displacing for permitting selection of a symbol in any of the rows of said font.

3. Optical signal translation apparatus in accordance with claim 1 and further comprising,
   at least one third reflecting surface formed with alternating transparent and reflecting portions for transmitting and reflecting respectively light rays with a contiguous pair thereof associated with a particular column of said symbols,
   means for supporting each third reflecting surface with its length perpendicular to the plane bisecting the angle between said first and second reflecting surfaces and angularly oriented to direct light from said beam to said first surface and to direct light from said second surface toward a symbol projection plane when its reflecting portions intercept said path,
   and means for selectively displacing each third surface between a first position in which transparent portions intercept said path and a second position in which reflecting portions intercept said path,
   whereby in said second position a symbol in the font column associated with that third surface may be selected.

4. Optical signal translation apparatus in accordance with claim 3 and further comprising at least another pair of said first and second reflecting surfaces, said means for supporting and said means for selectively displacing for permitting selection of a symbol in any of the rows of said font.

References Cited

UNITED STATES PATENTS 3,204,539  9/1965  Plooij _____ 95—4.5

FOREIGN PATENTS 1,449,805  7/1966  France _____ 95—4.5

JOHN M. HORAN, Primary Examiner

R. A. WINTERCORN, Assistant Examiner

U.S. Cl. X.R.

95—4.5; 355—49